(12) United States Patent
Bredemeyer et al.

(10) Patent No.: US 10,071,546 B2
(45) Date of Patent: Sep. 11, 2018

(54) APPARATUS AND METHOD FOR HYBRID MANUFACTURING

(71) Applicants: Graham Bredemeyer, Chattanooga, TN (US); James Matthew Barron, Chattanooga, TN (US)

(72) Inventors: Graham Bredemeyer, Chattanooga, TN (US); James Matthew Barron, Chattanooga, TN (US)

(73) Assignee: Collider, Inc., Chattanooga, TN (US)

( * ) Notice: Subject to any disclaimer, the term of this patent is extended or adjusted under 35 U.S.C. 154(b) by 280 days.

(21) Appl. No.: 15/173,158

(22) Filed: Jun. 3, 2016

(65) Prior Publication Data

US 2016/0354981 A1    Dec. 8, 2016

Related U.S. Application Data

(60) Provisional application No. 62/305,144, filed on Mar. 8, 2016, provisional application No. 62/171,690, filed on Jun. 5, 2015.

(51) Int. Cl.
*B33Y 80/00* (2015.01)
*B29C 39/02* (2006.01)
(Continued)

(52) U.S. Cl.
CPC .............. *B33Y 80/00* (2014.12); *B29B 7/325* (2013.01); *B29B 7/728* (2013.01); *B29B 7/7471* (2013.01); *B29C 33/3842* (2013.01); *B29C 33/40* (2013.01); *B29C 39/02* (2013.01); *B29C 64/00* (2017.08); *B33Y 10/00* (2014.12);
(Continued)

(58) Field of Classification Search
CPC ......... B33Y 80/00; B33Y 10/00; B33Y 30/00; B29B 7/728; B29B 7/325; B29B 7/7471; B29C 64/00; B29C 33/3842; B29C 33/40; B29C 39/02; B29C 33/0077; B29C 33/0072; B29C 64/40; B29C 64/124; B29C 64/35; B29K 2995/0062
See application file for complete search history.

(56) References Cited

U.S. PATENT DOCUMENTS 5,700,406 A * 12/1997 Menhennett ............ B29C 33/38
264/219
6,375,880 B1 * 4/2002 Cooper ................... B29C 33/52
264/138
(Continued)

*Primary Examiner* — Matthew J Daniels
*Assistant Examiner* — Leith S Shafi
(74) *Attorney, Agent, or Firm* — Chambliss, Bahner & Stophel, P.C.

(57) ABSTRACT

An apparatus for hybrid manufacturing comprising a frame, a build plate that is adapted to move relative to the frame, a material pump that is adapted to pump one or more materials, a mixing head that is adapted to mix the one or more materials, a mixing hose that is in fluid communication with the material pump and the mixing head, a vacuum pump that is adapted to remove air from a mold, a vacuum hose that is in fluid communication with the vacuum pump and the mold, a vat that is adapted to retain a liquid, and a radiation source that is disposed adjacent to the vat. The apparatus prints the mold and fills the mold. A method comprising printing the mold with one or more mold materials, removing air from the mold, filling the mold with one or more primary materials, and dissolving the mold.

20 Claims, 9 Drawing Sheets

(51) Int. Cl.
  *B33Y 10/00* (2015.01)
  *B33Y 30/00* (2015.01)
  *B29B 7/74* (2006.01)
  *B29C 33/38* (2006.01)
  *B29C 33/40* (2006.01)
  *B29B 7/32* (2006.01)
  *B29B 7/72* (2006.01)
  *B29C 64/00* (2017.01)
  *B29C 33/00* (2006.01)

(52) U.S. Cl.
  CPC .......... *B33Y 30/00* (2014.12); *B29C 33/0072* (2013.01); *B29C 33/0077* (2013.01); *B29K 2995/0062* (2013.01)

(56) References Cited

U.S. PATENT DOCUMENTS

| | | | | |
|---|---|---|---|---|
| 6,616,885 B2* | 9/2003 | Lombardi | ............. | B29C 64/124 264/138 |
| 7,448,433 B2* | 11/2008 | Ortiz | ........................ | B22C 7/00 164/35 |
| 2012/0193841 A1* | 8/2012 | Wang | .................... | B22F 3/1055 264/645 |
| 2017/0106594 A1* | 4/2017 | Gardiner | ................ | B33Y 30/00 |

\* cited by examiner

APPARATUS AND METHOD FOR HYBRID MANUFACTURING

CROSS-REFERENCES TO RELATED APPLICATIONS/PATENTS

This application relates back to and claims the benefit of priority from U.S. Provisional Application for Patent Ser. No. 62/305,144 titled "3D Printing Process" and filed on Mar. 8, 2016, and U.S. Provisional Application for Patent Ser. No. 62/171,690 titled "3D Printing Process" and filed on Jun. 5, 2015.

FIELD OF THE INVENTION

The present invention relates generally to apparatuses and methods for manufacturing, and particularly to apparatuses and methods for casting and additive manufacturing.

BACKGROUND AND DESCRIPTION OF THE PRIOR ART

It is known to use additive manufacturing to manufacture three-dimensional (3D) products. Conventional apparatuses and methods for additive manufacturing, however, suffer from one or more disadvantages. For example, conventional additive manufacturing apparatuses and methods are undesirably slow and expensive. Conventional additive manufacturing is also limited to an undesirably small number of material options and the manufactured product has undesirable directional mechanical properties and other manufacturing defects. In addition, conventional additive manufacturing is not well-suited to handle multi-material applications.

It is also known to use casting to manufacture 3D products. Conventional apparatuses and methods for casting, however, suffer from one or more disadvantages. For example, conventional casting apparatuses and methods require expensive molds that are time-consuming and require skilled labor to produce. Conventional casting molds are also not dissolvable or otherwise easily disposed, and the manufactured product frequently includes undesirable voids and other manufacturing defects.

It would be desirable, therefore, if an apparatus and method for hybrid manufacturing could be provided that would increase the speed at which products could be manufactured and reduce the cost and difficulty of manufacturing products. It would also be desirable if such an apparatus and method for hybrid manufacturing could be provided that would increase the number of material options and minimize or eliminate directional mechanical properties, voids, and other manufacturing defects. It would be further desirable if such an apparatus and method for hybrid manufacturing could be provided that would allow for the use of multiple different materials in a single product. It would be still further desirable if such an apparatus and method for hybrid manufacturing could be provided that would utilize dissolvable molds.

ADVANTAGES OF THE PREFERRED EMBODIMENTS OF THE INVENTION

Accordingly, it is an advantage of the preferred embodiments of the invention claimed herein to provide an apparatus and method for hybrid manufacturing that increase the speed at which products could be manufactured and reduce the cost and difficulty of manufacturing products. It is also an advantage of the preferred embodiments of the invention claimed herein to provide an apparatus and method for hybrid manufacturing that increase the number of material options and minimize or eliminate directional mechanical properties, voids, and other manufacturing defects. It is another advantage of the preferred embodiments of the invention claimed herein to provide an apparatus and method for hybrid manufacturing that allow for the use of multiple different materials in a single product. It is still another advantage of the preferred embodiments of the invention claimed herein to provide an apparatus and method for hybrid manufacturing that utilize dissolvable molds.

Additional advantages of the preferred embodiments of the invention will become apparent from an examination of the drawings and the ensuing description.

SUMMARY OF THE INVENTION

The apparatus of the invention comprises an apparatus for hybrid manufacturing. The preferred apparatus for hybrid manufacturing comprises a frame, a build plate that is adapted to move relative to the frame, a material pump that is adapted to pump one or more materials, a mixing head that is adapted to mix the one or more materials, a mixing hose that is in fluid communication with the material pump and the mixing head, a vacuum pump that is adapted to remove air from a mold, a vacuum hose that is in fluid communication with the vacuum pump and the mold, a vat that is adapted to retain a liquid, and a radiation source that is disposed adjacent to the vat. The preferred apparatus prints the mold and fills the mold.

The method of the invention comprises a method for hybrid manufacturing. The preferred method comprises providing an apparatus for hybrid manufacturing. The preferred apparatus for hybrid manufacturing comprises a frame, a build plate that is adapted to move relative to the frame, a material pump that is adapted to pump one or more materials, a mixing head that is adapted to mix the one or more materials, a mixing hose that is in fluid communication with the material pump and the mixing head, a vacuum pump that is adapted to remove air from a mold, a vacuum hose that is in fluid communication with the vacuum pump and the mold, a vat that is adapted to retain a liquid, and a radiation source that is disposed adjacent to the vat. The preferred apparatus prints the mold and fills the mold. The preferred method further comprises printing the mold with one or more mold materials, removing air from the mold, filling the mold with one or more primary materials, and dissolving the mold.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
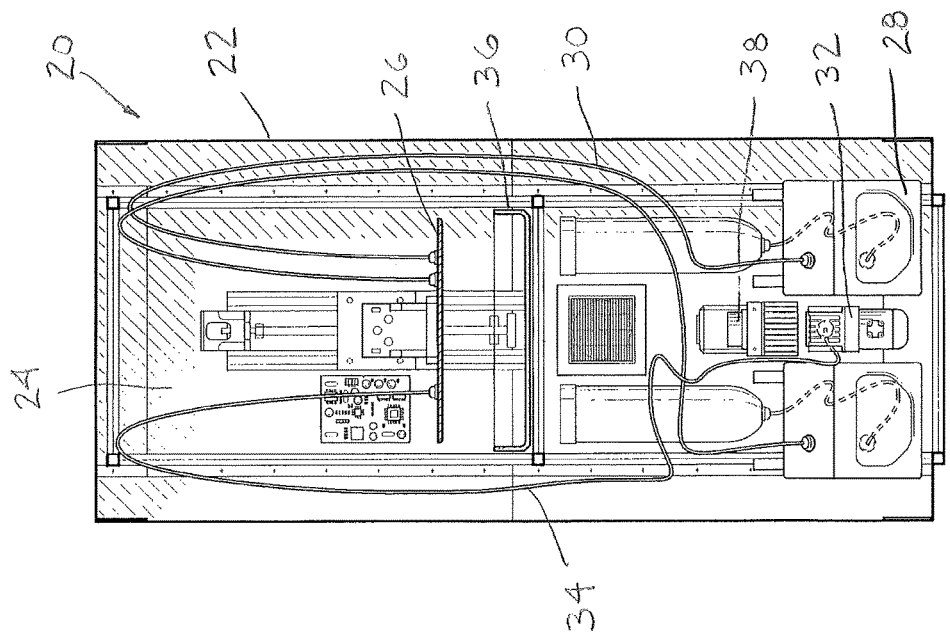
FIG. 1 is a front view of the preferred embodiment of the apparatus for hybrid manufacturing in accordance with the present invention.

Referring now to the drawings, the preferred embodiments of the apparatus and method for hybrid manufacturing in accordance with the present invention is illustrated by FIGS. 1 through 15. As shown in FIGS. 1-15, the preferred apparatus and method for hybrid manufacturing are adapted to increase the speed at which products could be manufactured and reduce the cost of manufacturing products. The preferred apparatus and method for hybrid manufacturing are also adapted to increase the number of material options and minimize or eliminate directional mechanical properties, voids, and other manufacturing defects. The preferred apparatus and method for hybrid manufacturing are further adapted to allow for the use of multiple different materials in a single product. The preferred apparatus and method for hybrid manufacturing are still further adapted to utilize dissolvable molds.

Referring now to FIG. 1, a front view of the preferred embodiment of the apparatus for hybrid manufacturing in accordance with the present invention is illustrated. As shown in FIG. 1, the preferred apparatus for hybrid manufacturing is designated generally by reference numeral 20. Preferred apparatus for hybrid manufacturing 20 comprises a 3D printer having frame 22 which is adapted to provide support for the other components of the 3D printer. Preferred frame 22 defines chamber 24. Preferred apparatus for hybrid manufacturing 20 also comprises build plate 26 which is adapted to move relative to frame 22. Preferably, build plate 26 is adapted to move vertically along the z-axis relative to frame 22. Preferred apparatus for hybrid manufacturing 20 also comprises material pump 28 which is adapted to pump one or more materials to one or more mixing heads (see FIGS. 3-8) via mixing hose 30. The preferred mixing head is adapted to mix the materials pumped by material pump 28, and preferred mixing hose 30 is in fluid communication with the material pump and the mixing head. Preferred mixing hose 30 is connected at build plate 26. In the preferred embodiments of apparatus for hybrid manufacturing 20, the 3D printer is adapted to print mixing head and mixing hose 30.

Still referring to FIG. 1, preferred apparatus for hybrid manufacturing 20 further comprises vacuum pump 32 which is adapted to remove air from a mold via vacuum hose 34. Preferred vacuum hose 34 is in fluid communication with vacuum pump 32 and the mold and is connected at build plate 26. In the preferred embodiments of apparatus for hybrid manufacturing 20, the 3D printer is adapted to print vacuum hose 34. Preferred apparatus for hybrid manufacturing 20 further comprises vat 36 which is adapted to retain a liquid. Preferred vat 36 comprises at least one of a PVDC layer and a FEP layer. Preferred apparatus for hybrid manufacturing 20 also comprises radiation source 38 which is disposed adjacent to the vat. The preferred radiation source 38 is a high-power light-emitting diode (HP-LED) light such as a near UV spectrum, 405 nanometer light that is adapted to cure the printing materials used by the apparatus via photoreaction, but it is contemplated within the scope of the invention that any suitable radiation source may be used including without limitation a laser. In the preferred embodiments of the apparatus for hybrid manufacturing, the 3D printer prints the mold with one or more mold materials and fills the mold with one or more primary materials. While FIG. 1 illustrates the preferred configuration and arrangement of the apparatus for hybrid manufacturing, it is contemplated within the scope of the invention that the apparatus for hybrid manufacturing may be of any suitable configuration and arrangement.

Figure 2:
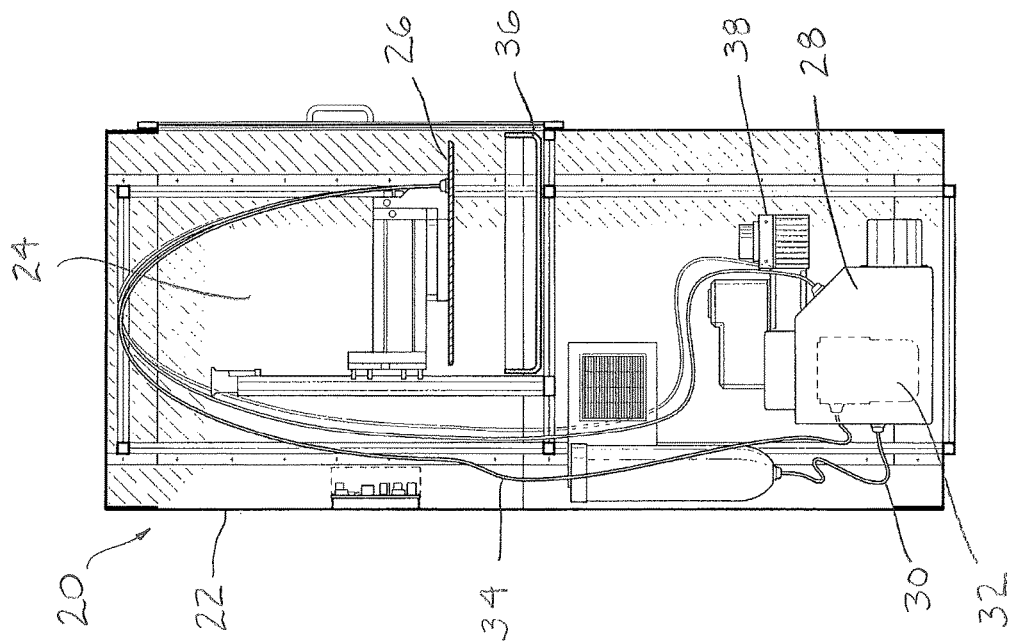
FIG. 2 is a left side view of the preferred apparatus for hybrid manufacturing illustrated in FIG. 1.

Referring now to FIG. 2, a left side view of preferred apparatus for hybrid manufacturing 20 is illustrated. As shown in FIG. 2, preferred apparatus for hybrid manufacturing 20 comprises frame 22, chamber 24, build plate 26, material pump 28, material hose 30, vacuum pump 32, vacuum hose 34, vat 36, and radiation source 38.

Figure 3:
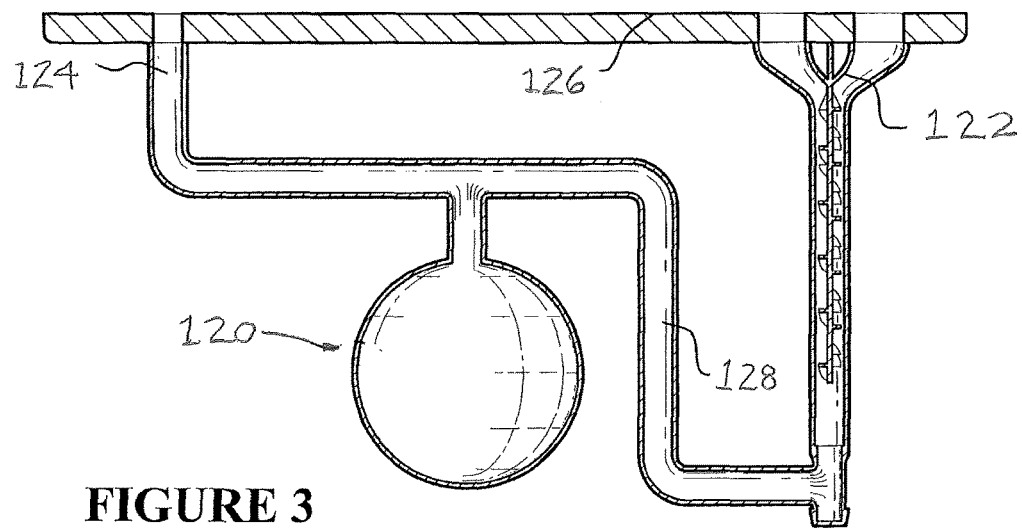
FIG. 3 is a partial sectional view of a first exemplary mold in accordance with the present invention.

Referring now to FIG. 3, a front sectional view of a first exemplary mold is illustrated. As shown in FIG. 3, the first exemplary mold is designated generally by reference numeral 120. Exemplary mold 120 is in fluid communication with mixing head 122 and vacuum hose 124. Exemplary mold is also in fluid communication with build plate 126 and material hose 128.

Figure 4:
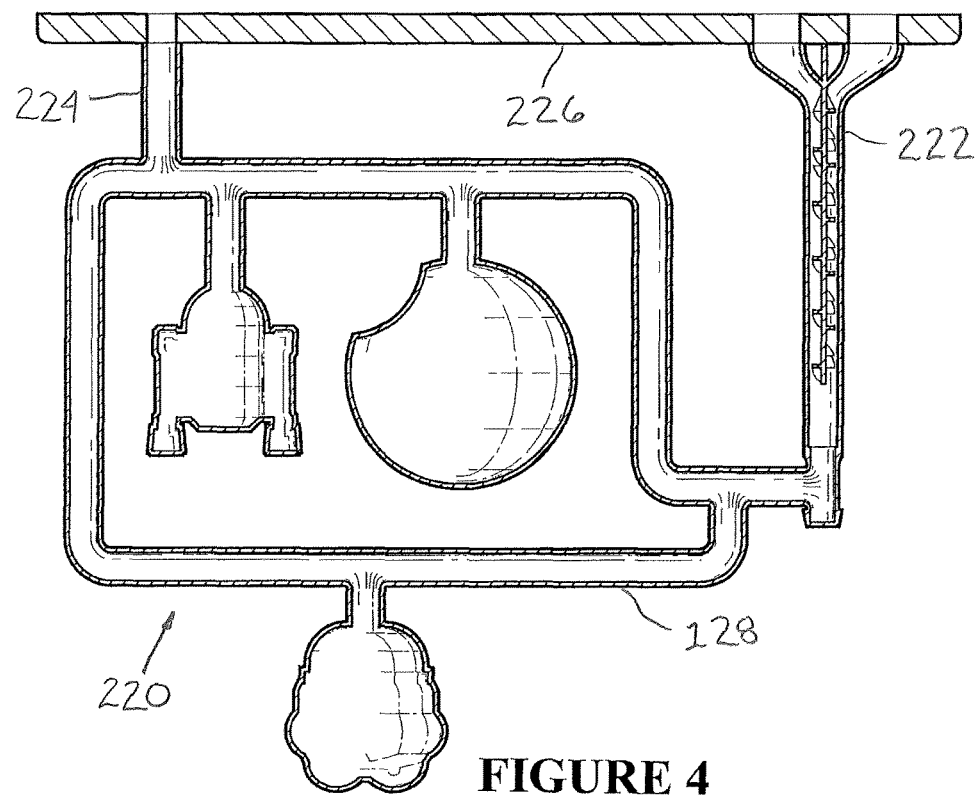
FIG. 4 is a partial sectional view of a second exemplary mold in accordance with the present invention.

Referring now to FIG. 4, a front sectional view of a second exemplary mold is illustrated. As shown in FIG. 4, the second exemplary mold is designated generally by reference numeral 220. Exemplary mold 220 is in fluid communication with mixing head 222 and vacuum hose 224. Exemplary mold is also in fluid communication with build plate 226 and material hose 228.

Figure 5:
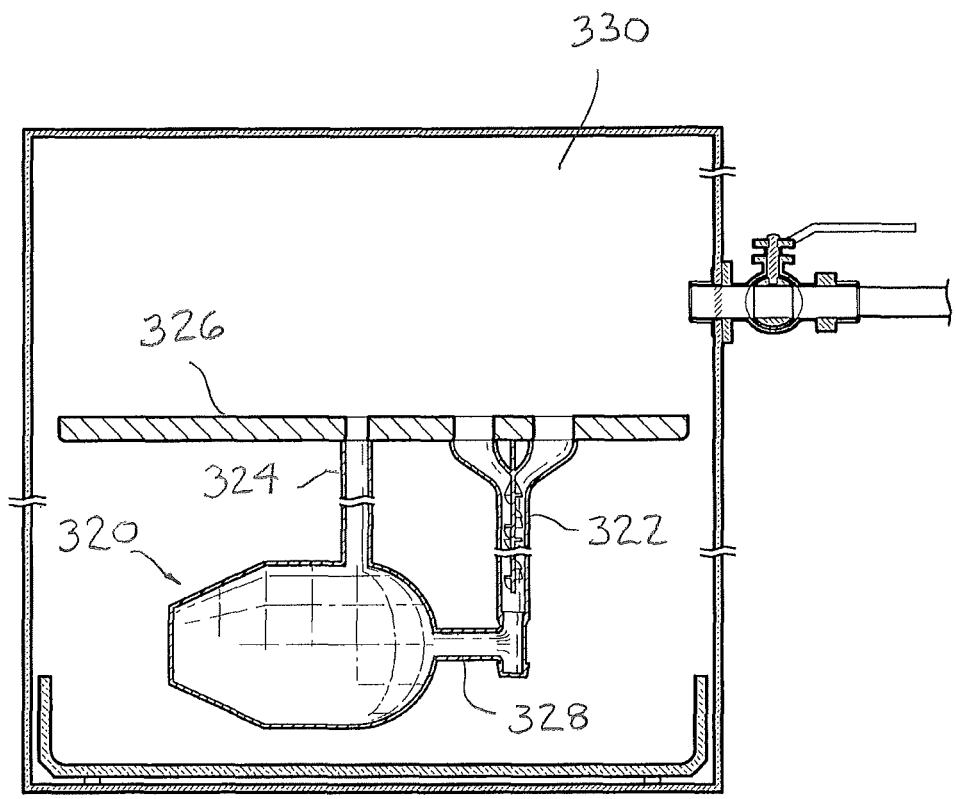
FIG. 5 is a partial sectional view of a third exemplary mold in accordance with the present invention shown in an environmentally-controlled chamber.

Referring now to FIG. 5, a front sectional view of a third exemplary mold is illustrated. As shown in FIG. 5, the third exemplary mold is designated generally by reference numeral 320. Exemplary mold 320 is in fluid communication with mixing head 322 and vacuum hose 324. Exemplary mold is also in fluid communication with build plate 326 and material hose 328. Exemplary mold 320 is disposed in chamber 330 which is adapted to be sealed, pressurized, vacuumed, and otherwise environmentally controlled, e.g. temperature, humidity, and the like.

Figure 6:
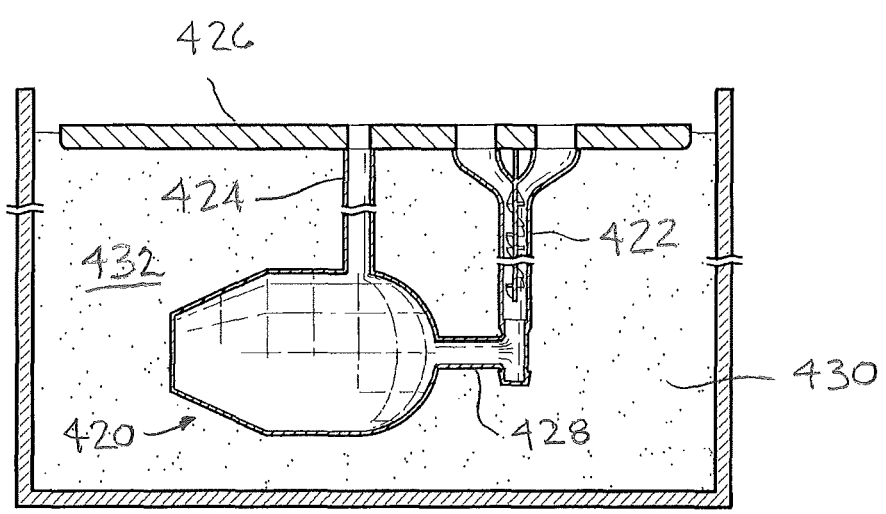
FIG. 6 is a partial sectional view of a fourth exemplary mold in accordance with the present invention shown with a filling material.

Referring now to FIG. 6, a front sectional view of a fourth exemplary mold is illustrated. As shown in FIG. 6, the fourth exemplary mold is designated generally by reference numeral 420. Exemplary mold 420 is in fluid communication with mixing head 422 and vacuum hose 424. Exemplary mold is also in fluid communication with build plate 426 and material hose 428. Exemplary mold 420 is disposed in chamber 430 which is filled with a refractory material such as supporting sand 432 for pouring molten or heavy primary materials.

Figure 7:
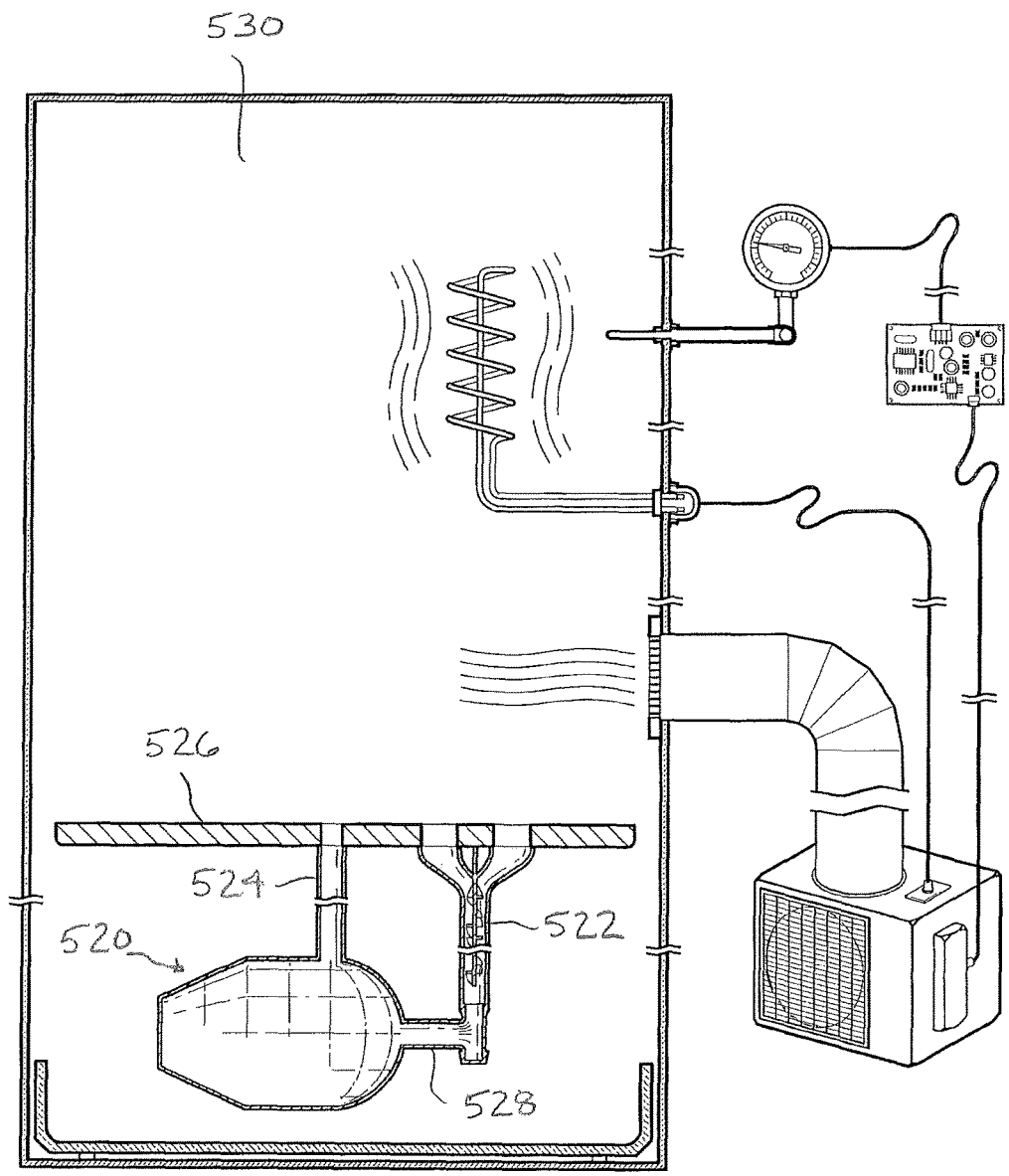
FIG. 7 is a partial sectional view of a fifth exemplary mold in accordance with the present invention shown in an environmentally-controlled chamber.

Referring now to FIG. 7, a front sectional view of a fifth exemplary mold is illustrated. As shown in FIG. 7, the fifth exemplary mold is designated generally by reference numeral 520. Exemplary mold 520 is in fluid communication with mixing head 522 and vacuum hose 524. Exemplary mold is also in fluid communication with build plate 526 and material hose 528. Exemplary mold 520 is disposed in chamber 530. Preferred chamber 526 is adapted to control the environment in the chamber, e.g. the temperature, the humidity, and the like.

Figure 8:
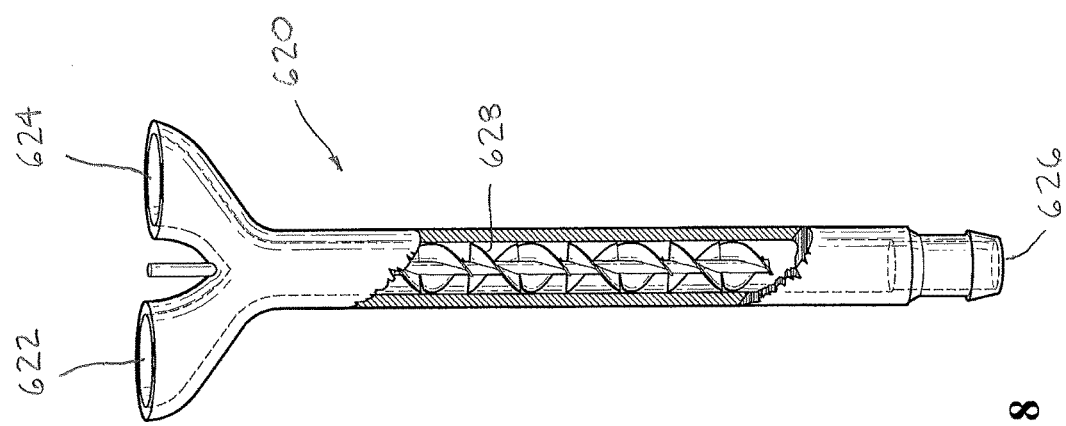
FIG. 8 is a partial sectional view of the preferred mixing head in accordance with the present invention.

Referring now to FIG. 8, a partial sectional view of a preferred embodiment of the mixing head is illustrated. As shown in FIG. 8, the preferred mixing head is designated generally by reference numeral 620. Preferred mixing head 620 comprises first inlet 622, second inlet 624, and outlet 626. The inlets and the outlet are in fluid communication with each other. Preferably, helix 628 is disposed between the inlets and the outlet. While FIG. 8 illustrates preferred helix 628, it is contemplated that mixing head 620 may be of any suitable configuration and arrangement adapted to mix primary materials.

Figure 9:
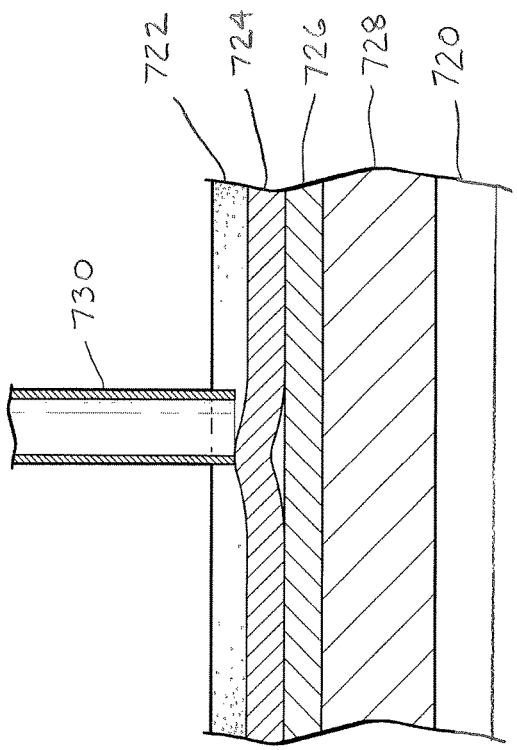
FIG. 9 is a partial sectional view of the preferred vat in accordance with the present invention.

Referring now to FIG. 9, a partial sectional view of an exemplary vat is illustrated. As shown in FIG. 9, the exemplary vat is designated generally by reference numeral 720. Preferred vat 720 comprises liquid plastic 722, PVDC or FEP layer 724, silicone or PDMS 726, and acrylic 728. Mold wall 730 is illustrated slightly adhering to PVDC or FEP layer 724. While FIG. 9 illustrates the preferred vat materials and the preferred layer arrangement, it is contemplated within the scope of the invention that other suitable vat materials may be used and any suitable layer arrangement may be used.

Figure 10:
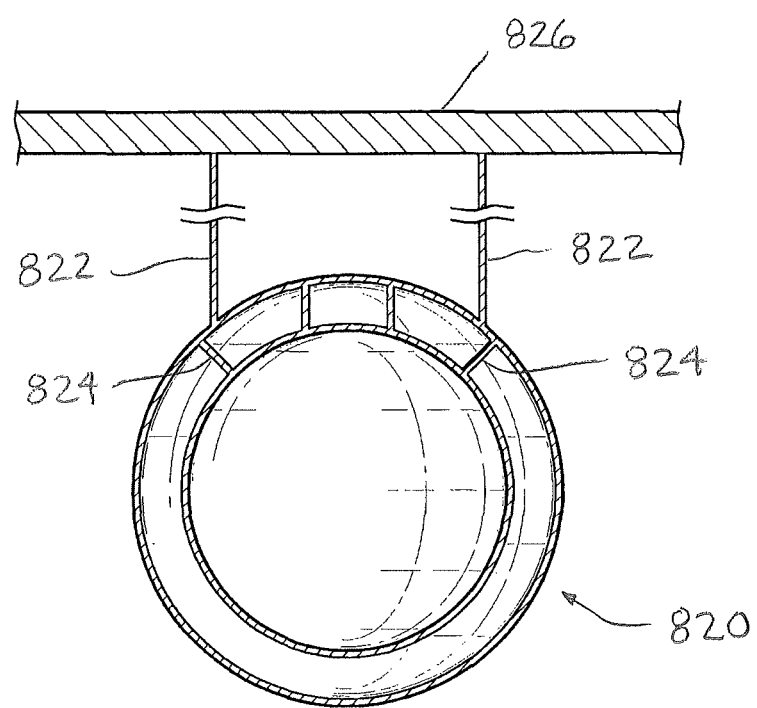
FIG. 10 is a partial sectional view of a sixth exemplary mold in accordance with the present invention.

Referring now to FIG. 10, a partial sectional view of a sixth exemplary mold is illustrated. As shown in FIG. 10, the sixth exemplary mold is designated generally by reference numeral 820. Exemplary mold 820 is supported by support structures 822 and comprises negative space supports 824 which may be filled in during post processing steps. Preferred support structures 822 break through the produced part and are in direct contact with build plate 826.

Figure 11:
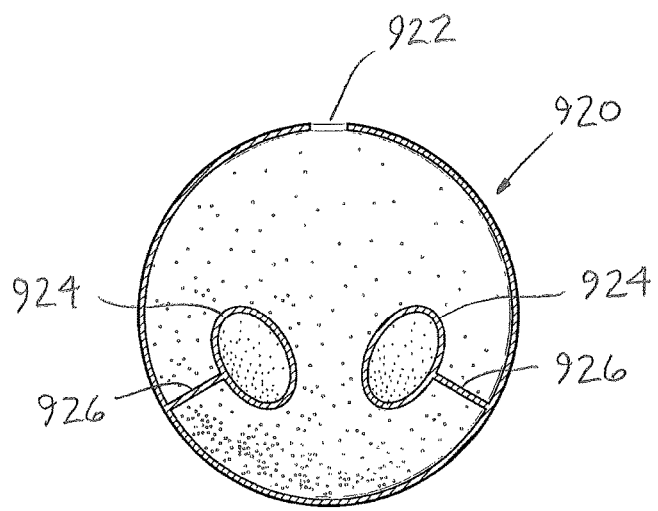
FIG. 11 is a partial sectional view of a seventh exemplary mold in accordance with the present invention.

Referring now to FIG. 11, a partial sectional view of a seventh exemplary mold is illustrated. As shown in FIG. 11, the seventh exemplary mold is designated generally by reference numeral 920. Exemplary mold 920 is adapted to manufacture a product comprising more than one material. More particularly, exemplary mold 920 is adapted to manufacture a product in which a secondary material is encased within a primary material. Exemplary mold 920 comprises primary opening 922 which is adapted to allow a primary material to be filled into the mold. In addition, exemplary mold 920 comprises solid sacrificial positives 924 and solid sacrificial sprues 926 which are adapted to be filled with a secondary material.

Figure 12:
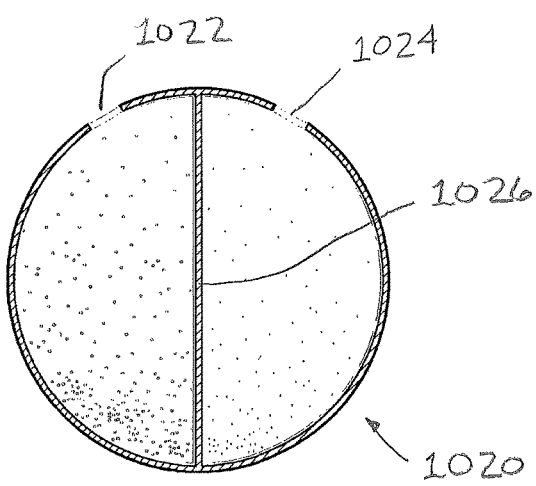
FIG. 12 is a partial sectional view of an eighth exemplary mold in accordance with the present invention.

Referring now to FIG. 12, a partial sectional view of an eighth exemplary mold is illustrated. As shown in FIG. 12, the eighth exemplary mold is designated generally by reference numeral 1020. Exemplary mold 1020 is also adapted to manufacture a product comprising more than one material. More particularly, exemplary mold 1020 is adapted to manufacture a product having two different materials adjacent to each other. Exemplary mold 1020 comprises first material opening 1022 which is adapted to receive a first material, second material opening 1024 which is adapted to receive a second material, and dividing wall 1026 which is adapted to keep the first material and the second material separated from each other. While FIG. 12 illustrates a mold adapted to manufacture a product having two different materials adjacent to each other, it is contemplated within the scope of the invention that a mold may be adapted to manufacture a product having more than two different materials, some or all of which are adjacent to each other or some or all of which are spaced apart from each other.

Figure 13:
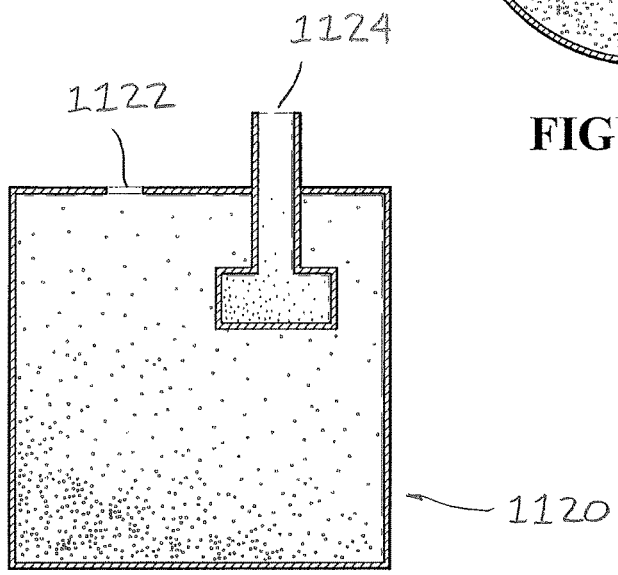
FIG. 13 is a partial sectional view of a ninth exemplary mold in accordance with the present invention.

Referring now to FIG. 13, a partial sectional view of a ninth exemplary mold is illustrated. As shown in FIG. 13, the ninth exemplary mold is designated generally by reference numeral 1120. Exemplary mold 1120 is also adapted to manufacture a product comprising more than one material. More particularly, exemplary mold 1120 is adapted to manufacture a product comprising interlocking parts made from different materials. Exemplary mold 1120 comprises female part opening 1122 which is adapted to receive a first material and male part opening 1124 which is adapted to receive a second material.

Figure 14A:
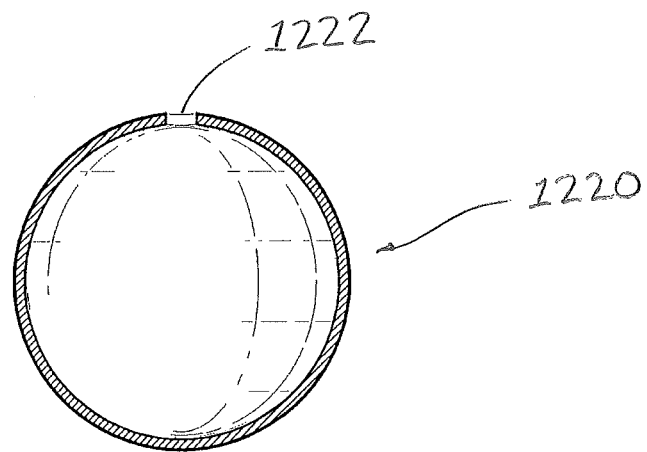
FIG. 14A is a partial sectional view of a tenth exemplary mold.
Figure 14B:
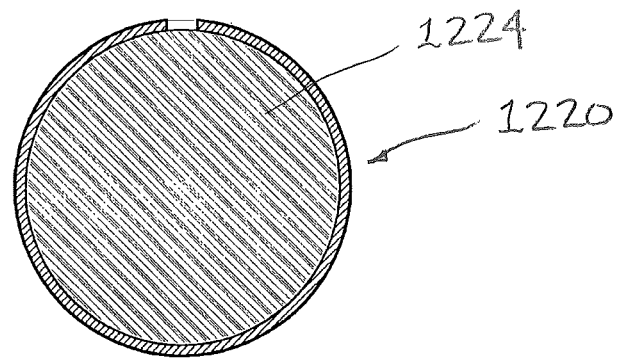
FIG. 14B is a partial sectional view of the exemplary mold illustrated in FIG. 14A filled with a primary material.
Figure 14C:
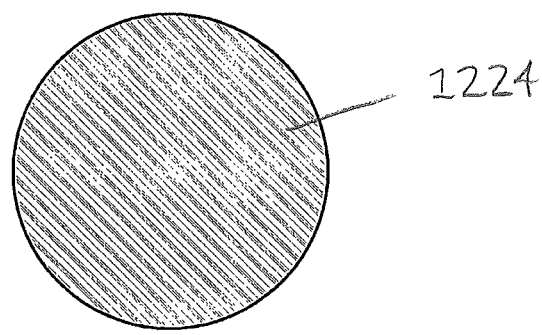
FIG. 14C is a partial sectional view of the primary material illustrated in FIG. 14B after the exemplary mold has been dissolved.

Referring now to FIGS. 14A-C, a partial sectional view of three stages of the preferred hybrid manufacturing process is illustrated. As shown in FIG. 14A, the first stage is the 3D-printed empty mold designated generally by reference numeral 1220. Preferred mold 1220 comprises opening 1222 disposed at the top of the mold. As shown in FIG. 14B, the second stage of the preferred hybrid manufacturing process is mold 1220 filled with product material 1224. As shown in FIG. 14C, the third stage of the preferred hybrid manufacturing process is the finished product comprising product material 1224 after the dissolvable mold has been dissolved.

Figure 15:
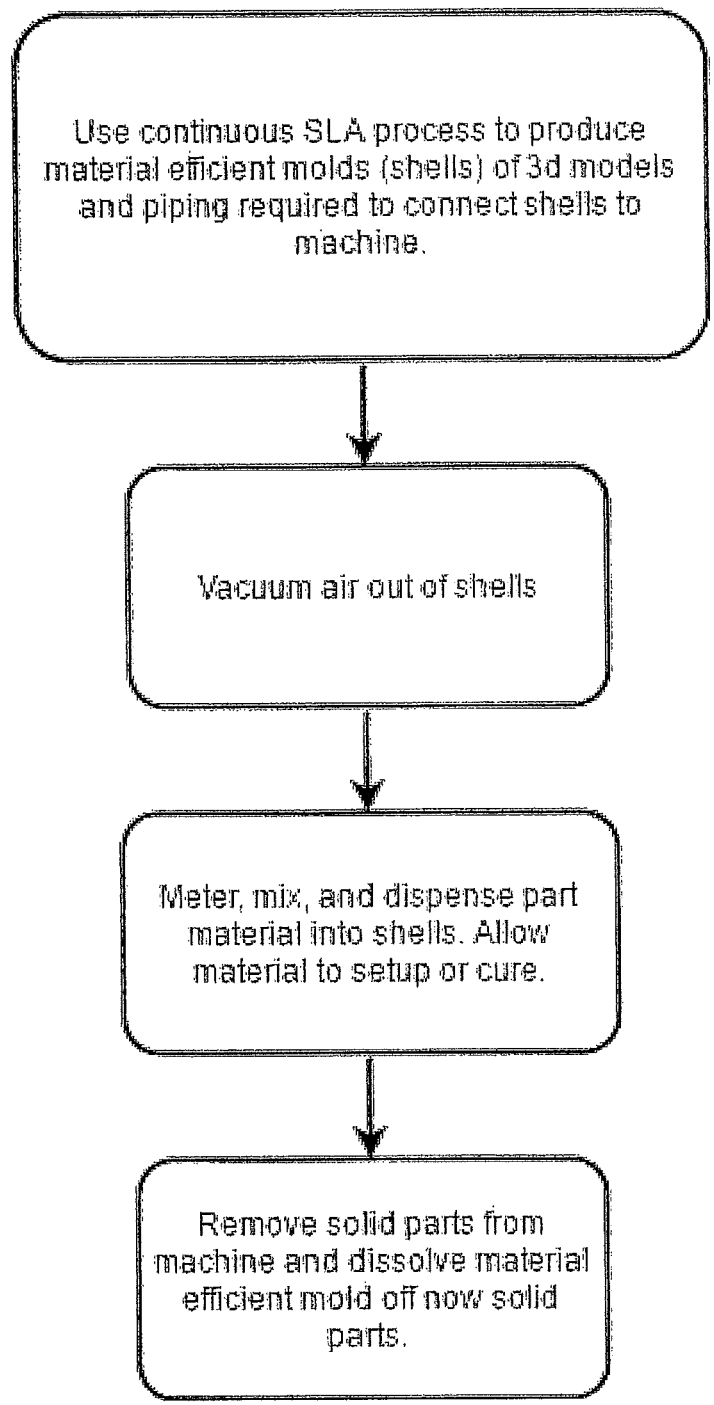
FIG. 15 is a flow chart detailing, in part, the preferred method for hybrid manufacturing in accordance with the present invention.

Referring now to FIG. 15, a flow chart detailing, in part, the preferred method for hybrid manufacturing in accordance with the present invention is illustrated. The preferred method for hybrid manufacturing comprises providing an apparatus for hybrid manufacturing such as the 3D printer described hereinabove. As shown in FIG. 15, the preferred method for hybrid manufacturing further comprises printing the mold with one or more mold materials, removing air from the mold, filling the mold with the one or more primary materials, and dissolving the mold. In the preferred embodiments of the method for hybrid manufacturing, the 3D printer prints the mold and fills the mold. Preferably, the mold is continuously printed via continuous energy and continuous build plate movement or stereolithography. In addition, the preferred mold is water-soluble and comprises at least one of a high impact polystyrene, a polyvinyl alcohol, an acrylic monomer, a sugar, and a wax. In one preferred embodiment, the mold comprises a solution including methacrylic acid, polyvinylpyrrolidone, methacrylic anhydride, phenylbis (2,4,6-trimethylbenzoyl) phosphine, and N,N-dimethylacrylamide. The preferred primary material comprises at least one of a resin, a ceramic, a metal powder, a silicon, a urethane, a clay material, a plastic, a fiber, a biological material, and a bio-active material.

In other preferred methods for hybrid manufacturing, the method also comprises placing a solid sacrificial material within the mold, connecting the solid sacrificial material to the mold via a sprue, dissolving the solid sacrificial material after the mold is filled with the primary material, and conveying a secondary material into an open space left by the dissolved solid sacrificial material. In still other preferred methods for hybrid manufacturing, the method further comprises 3D printing the mixing head, the mixing hose, the vacuum hose, and the support structures. In other preferred methods for hybrid manufacturing, the method still further comprises controlling water permeation, detecting manufacturing defects, controlling the environment in the chamber, and mixing multiple materials during the printing stage, including but not limited to multiple photocurable resins, multiple powder materials in a sintering process, and/or multiple thermoplastic extrusion feedstocks. Preferably, the method of the invention may utilize one or more of the following print technologies: SLS, SLA, FDM, and the like.

In operation, several advantages of the preferred embodiments of the apparatus and method for hybrid manufacturing are achieved. Initially, a 3D model file or other digital file used to demonstrate points in space is resampled with an offset of varying unit of its original size. This process essentially finds a collection of points in space that are a uniform distance from the original model, thereby producing an "offset" model that is larger than the original at all points. The original file is then converted into negative digital space and digitally placed within its resampled counterpart. One or more holes or negative spaces are then placed through the resampled file intersecting its original negative space counterpart. The output this process produces is an extremely material efficient mold or shell of the original 3D data. Optionally, an algorithm can be run on a set of multiples of these output files that produces small digital model "ties" or lines between them while also orienting each model with the holes pointing up. This optional action enables the models to stand upright once digitally manufactured with holes pointing up such that they are adapted to be filled with their counterpart material.

The digital output from the former process (3D data model of a material efficient mold) may then be used to produce a physical version of the 3D data via additive manufacturing/3D printing. The part can be produced using material extrusion, powder fusion, material jetting, vat photopolymerization, continuous energy and build platform movement, sintering, binder jetting, or other additive means. The material of the mold or shell commonly produced using this process is a sacrificial material such as HIPS (high impact polystyrene), PVA (Polyvinyl Alcohol), sugar, or other materials suitable for additive manufacturing that are soluble in water or another solvent or that melt away when heat is applied. Optionally, the mold/shell's materials may not be sacrificial.

The output physical mold or shell is then filled with any thermosetting resin that cures via a combination of chemical reaction and heat. The mold may be filled manually or via automated equipment that both mixes and disperses a calculated amount of material such as resin. A dispersion system could be mounted on an industrial robot to automate the filling of the mold or built into or retrofitted to the additive platform producing the mold. To ensure no bubbles are formed within the resin and end use product, bubbles may be removed by placing the mold filled with material inside a vacuum or on a shaking/vibrating table, or by applying ultrasound to the mold filled with material. Optionally, any of these technologies could be built into or retrofitted to the original additive machine that produced the mold. The material in the mold is then left to cure for the amount of time necessary to demold the product. The curing process can be expedited by heating the material as it cures.

The output of the former process (mold filled with cured material/end product) is then submersed in water or another solvent, and/or heated in order to remove the sacrificial mold. Optionally, one or more solvents may be placed inside an ultrasonic cleaner or heated bath in order to expedite the dissolving process. Once the sacrificial mold dissolves all that remains is a solid end product which is produced more quickly than additive by itself, has no directional mechanical properties, and may be made from a broader range of materials than additive manufacturing by itself can produce. Also, the end product may be injected with materials different than itself, allowing for products that contain multiple materials. Optionally, when the additively produced molds are not made from sacrificial material, the final product consists of both the original 3D-printed mold and the internal cured material. When producing products with sacrificial molds, the cured material is the final product output. It is contemplated within the scope of the invention that end products can be finished with any traditional finishing processes such as sanding, wet sanding, media blasting, media vibration, heat treatment, kiln firing, spray coatings, plating, and the like. It is also contemplated within the scope of the invention that the materials may be infused with ceramics and metal powders up to a necessary loading value for firing processes to produce ceramic and metal parts with either of both the primary filling resin or printed mold material serving as a sacrificial binder.

Multi-material printing using this process involves the placement of solid sacrificial material where a material other than the primary material is desired when the secondary material is completely encased in the primary material. The solid sacrificial part is connected to the external of the original sacrificial mold via a thin sprue. The sprue and the solid sacrificial material are dissolved during the solvent process. Secondary material is then injected into the hollow cavity of the product where the dissolved sacrificial solid part was originally via the thin cavity left by the dissolved sprue. Once the desired secondary material is cured, the sprue cavity can then also be filled with the primary material if desired for either aesthetics or any other reason. This process allows multi-material parts to be produced with this process when secondary materials are encased within the primary material.

Where multi-material products are required and multiple materials are in direct contact with each other the sacrificial molds and process described herein can be carried out separately, and the different materials can be connected to one another via a fastening means such as glue, tape, or another adhesive, a threaded fastener, such as screws or bolts, rivets, nails, staples, hook and loop fasteners, and the like. It is also contemplated within the scope of the invention that two abutting part may be connected by breaking down the chemicals of the abutting surfaces of the product to produce bonds.

Where multi-material products are required and the multiple materials are interlocking, a slightly different process is used. The separate molds overlap one another and therefore, while they are their own separate cavities within the product their molds are interconnected. In addition, each cavity has its own hole for receiving material. After both materials have set, the sacrificial mold is dissolved leaving a tiny gap as thin as the shell between the interconnected parts. Thereafter, the gap left behind can be filled with a desired material and left to set to produce a fully solid multi-material part where interconnecting materials are required. Alternatively, gaps can be left between interlocking parts where desired for moving parts and many more applications.

In addition, the preferred embodiments of the apparatus and method for hybrid manufacturing reduce the adherence of cured mold material to the build vat in a vat polymerization printing method system. More particularly, the use of a thin film made of a polyvinyl chloride based polymer such as PVDC or fluorinated ethylene propylene (FEP), such that the film is completely supported by a layer underneath the film which has some adherence to the film. This allows the film to locally deform, causing release of the cured artifact, without distorting other parts of the print. The tension built up in the film locally by any adhered regions as the artifact is pulled away from the surface then pulls the film off the adhered region. The film then re-attaches to the supporting structure underneath, allowing the next layer to be cured.

An additional method of reducing adherence is the use of a semipermeable membrane that allows some flow of a liquid solvent, potentially but not limited to H2O, through the membrane. This solvent allows curing of photopolymer to a limited degree in the region of the build vat. This system does not require high-pressure introduction of a material to the membrane, since sufficient concentrations can be achieved under normal pressures due to the higher density of liquid solvent.

Because of the unique geometry of the printed artifacts produced by the preferred process, positive air pressure can be introduced through the vacuum and mixing hoses included in each geometry. This positive pressure can aid in releasing the artifact from the build vat without damaging the artifact or the vat. Especially this can be used in conjunction with locally deformable thin film coverings or solvent diffusing release layer.

The preferred embodiments of the apparatus and method for hybrid manufacturing also reduce or eliminate voids in the end product. More particularly, in order to prevent voids in final products manufactured in molds, vacuum force may be applied to the interior of a mold to evacuate the mold of any air that might otherwise be trapped. This vacuum force may also "pull" material into voids due to air trapped in the material. Additionally, positive air pressure force can also be applied to the interior of molds to force material already introduced into the mold into any voids.

The preferred embodiments of the apparatus and method for hybrid manufacturing also combine the process of producing a mold and the process of filling the mold. To accomplish in-situ molding and casting, the materials to be introduced to the mold must be pre-mixed, degassed, mixed together, and optionally degassed after the second mixing. The preferred embodiments include several processes to accomplish these requirements that are unique to the situation of in-situ casting and molding into an additively manufactured mold.

Pre-mixing of molding components, which can include but are not limited to two-part resins, ceramic slurries, and waxes, can be accomplished via several methods. Preferably, a vibrational actuator can induce vibrations into the molding material components which cause even mixing of its constituent materials. This vibrational actuator can be composed of piezo materials, unbalanced rotational actuators, linear actuators using fluid or electrical power, or voice coils actuators. Optionally, magnetic or ferrous items placed in the material containers can be moved by moving electromagnetic fields to stir and evenly mix the constituents. Applied to each constituent separately, this vibrational motion can remove entrapped gases within the individual constituent materials, as well as evenly mix ingredients of each individual constituent material.

Vacuum gauge pressure can be applied to the interior of the containers of molding material to remove dissolved or mixed gasses in the mold material. Ambient pressure or higher pressure can then also be introduced to cause gas bubbles that formed during the vacuum stage of the process to collapse, along with applying vibration via piezo or other vibratory energy to the container. This can be done in cycles to completely eliminate entrapped gasses in the mold making materials.

The nature of additively manufactured molds can make vacuum or pressure degassing of the molded part difficult. Gasses introduced during the mixing stage then pose a problem for in-situ molding and casting. To solve this problem, a static mixing head in used in the system that combines parts of multi-part materials that require mixing. This part is evacuated of air along with the entire part and runner network. The evacuated mixing head does not supply gases that can be mixed into the material upstream of the mold. This mixing head can be, but does not have to be additively manufactured along with the mold and runner network. Additively manufacturing this mixing head has the advantage of being easier to maintain and clean, protecting the machine from having cured multi-part resin or material slurry in the machine components or tubing.

The runner network allows multiple parts to be manufactured with the in-situ casting process. This is a requirement to enable cost-effective production of parts with the combination of additive manufacturing and in-situ casting. These runners can be additively manufacture with the same process as the mixing head. Mold materials in these runners can be easily removed after the cast or molded part is removed from the build chamber. The ease of removal can be increased by designing the gate or entry of the runner into the mold to be easily broken in a post-processing step, or by the action of removal of the mold from the build chamber.

The molding materials can be metered and introduced into the mold or network of molds via, either singly or in combination, the differential pressure caused by the vacuum in the mold and/or the action of pumps designed to control the flow of molding materials. In all situations, flow measurement of the molding materials can be provided to ensure accurate amounts of materials are dispensed. This measurement can be used, either alone or in combination with other measurements, for error detection in the molding or casting process.

To support geometry that is difficult to print in the proper shape for in-situ casting, support structures can be added through the region that the final cast part would otherwise occupy. This then becomes un-filled negative space in the final part, which can be filled via post processing.

Post processing for this type of "negative support" may be accomplished with a syringe and molding tool whose geometry is created during the slicing process of the print job, and which is printed alongside the part.

The build volume can be heated for improved material properties of the final part, and also improved curing of the 3D printed casting mold artifact. This heating can be accomplished with a variety of means, preferably Infrared surface heating elements, but also volumetric heating methods such as resistance coils.

The preferred embodiments of the apparatus and method for hybrid manufacturing are also adapted to detect leaks in molds. Vacuum pump pressure (negative gauge pressure) may be pulled on the interior of a mold. Depending on the vacuum readings measured by a sensor while running the pump, conclusions can be drawn about whether or not there is a hole or that the mold is not watertight. If vacuum force is pulled and the rate of pressure readings adjust too slowly it can be inferred that there is a hole or leak. Additionally, if vacuum pressure is applied and vacuum pressures do not build up within the mold network, the presence of a hole in the mold can be inferred or identified. This allows for determining error modes in processes requiring this sort of check. Additionally, positive air pressure may also be applied to determine the same readings with a similar method reading positive gauge pressure.

The preferred embodiments of the apparatus and method for hybrid manufacturing are also adapted to detect errors in the material injection process. Leakage from molds and improperly filled molds can be detected using various sensors. Level or mass sensors reading the amount of material in a drip tray or other catch device positioned beneath a mold can detect material filling the tray, which can be inferred to be caused by a leak in a mold being filled with material. Sensors that can detect a disruption in a light path, or detect some object passing through or nearby them could be used underneath the mold system in a similar manner to detect material leaking from a mold network.

Torque measurements for pump motors or flow measurement sensors placed in the supply lines of a system used to introduce material into a mold could also be used to detect excess material flowing into a mold, indicating either the loss of material through leakage, or excess material being expelled through unintentional openings or expansions of the mold. In addition, this sort of sensor could detect unwanted deflection of the mold or thermal expansion of the molding system.

Thermal imaging systems may be used to detect exothermic or endothermic reactions of chemically reactive or photo-chemical materials that either comprise the mold or the mold filling materials, allowing for the measurement and assessment of mold condition and fill level of the mold.

Other light measuring systems could measure photons being reflected from surface, such as a laser measuring system or a structured light scanning system, which could be used to assess the completeness and imperviousness of the mold.

Preferably, a camera that is situated in the optical path so that it can image the outline of an exposed layer for metrology purposes. This image can be used to measure a profile and detect unwanted gaps that can become errors and leaks. This camera can be situated as part of a prism that aligns beams to the build vat.

The preferred embodiments of the apparatus and method for hybrid manufacturing are also adapted to produce molds suitable for investment casting. More particularly, the preferred embodiments are adapted to produce an additively manufactured mold to cast a wax pattern for further use in casting or molding processes. This is especially useful for metal investment casting that requires high purity and detailed positives. These in-situ molded wax positives created from additive methods can also include an appropriate gate, sprue, runner, and venting system, including all special modifications to such things, that the final positive will need for proper casting or molding operations.

In addition to wax, positive artifacts can be made with materials such as slurries of ceramic, metal, metal-bearing clay, plastic and thermoplastic, fibrous and fiber bearing versions of any of the materials, biological materials such as cells or tissue or castable bio-active materials (such as sugars, proteins, cartilage-type materials). This is beneficial due to the fact that these materials all have special processing needs when cast or molded separately.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A method for hybrid manufacturing, said method comprising:
   a. providing an apparatus for hybrid manufacturing, said apparatus comprising:
      (i) a frame;
      (ii) a build plate, said build plate being adapted to move relative to the frame;
      (iii) a material pump, said material pump being adapted to pump one or more materials;
      (iv) a first mixing hose, said first mixing hose being in fluid communication with the material pump;
      (v) a vacuum pump, said vacuum pump being adapted to remove air from a mold;
      (vi) a first vacuum hose, said first vacuum hose being in fluid communication with the vacuum pump;
      (vii) a vat; said vat being adapted to retain a liquid;
      (viii) a radiation source, said radiation source being disposed adjacent to the vat;
   b. providing a mixing head, a second mixing hose, and a second vacuum hose that are in fluid communication, wherein the mixing head and the second vacuum hose are connected with openings of the build plate;
   c. printing the mold with one or more mold materials such that the second mixing hose and the second vacuum hose are connected with the mold;
   d. removing air from the mold;
   e. filling the mold with the one or more primary materials;
   f. dissolving the mold;
   wherein the apparatus for hybrid manufacturing prints the mold and fills the mold.

2. The method of claim 1 wherein the mold is continuously printed.

3. The method of claim 1 wherein the mold is printed via continuous energy.

4. The method of claim 1 wherein the mold is printed via continuous build plate movement.

5. The method of claim 1 wherein the mold is water-soluble.

6. The method of claim 1 wherein the mold comprises at least one of a high impact polystyrene, a polyvinyl alcohol, an acrylic monomer, a sugar, and a wax.

7. The method of claim 1 wherein the primary material comprises at least one of a resin, a ceramic, a metal powder, a silicon, a urethane, a clay material, a plastic, a fiber, a biological material, and a bio-active material.

8. The method of claim 1 further comprising the placement of a solid sacrificial material within the mold.

9. The method of claim 8 wherein the solid sacrificial material is connected to the mold via a sprue.

10. The method of claim 9 wherein the solid sacrificial material is dissolved after the mold is filled with the primary material.

11. The method of claim 10 wherein a secondary material is conveyed into an open space left by the dissolved solid sacrificial material.

12. The method of claim 1 wherein the apparatus for hybrid manufacturing prints the mixing head.

13. The method of claim 1 wherein the apparatus for hybrid manufacturing prints the second mixing hose.

14. The method of claim 1 wherein the apparatus for hybrid manufacturing prints the second vacuum hose.

15. The method of claim 1 wherein the vat comprises at least one of a PVDC layer and a FEP layer.

16. The method of claim 1 further comprising controlling water permeation.

17. The method of claim 1 further comprising detecting manufacturing defects.

18. The method of claim 1 wherein the frame defines a chamber.

19. The method of claim 18 further comprising controlling the environment in the chamber.

20. A method for hybrid manufacturing, said method comprising:
 a. providing an apparatus for hybrid manufacturing, said apparatus comprising:
  (i) a frame;
  (ii) a build plate, said build plate being adapted to move relative to the frame;
  (iii) a material pump, said material pump being adapted to pump one or more materials;
  (iv) a first mixing hose, said first mixing hose being in fluid communication with the material pump;
  (v) a vacuum pump, said vacuum pump being adapted to remove air from a mold;
  (vi) a first vacuum hose, said first vacuum hose being in fluid communication with the vacuum pump;
  (vii) a vat; said vat being adapted to retain a liquid;
  (viii) a radiation source, said radiation source being disposed adjacent to the vat;
 b. printing the mold, a mixing head, a second mixing hose, and a second vacuum hose that are in fluid communication with one or more mold materials;
  wherein the mixing head and the second vacuum hose are connected with openings of the build plate; and
  wherein the second mixing hose and the second vacuum hose are connected with the mold;
 c. removing air from the mold;
 d. filling the mold with the one or more primary materials;
 e. dissolving the mold;
  wherein the apparatus for hybrid manufacturing prints the mold and fills the mold.

* * * * *